(12) United States Patent
Guenther et al.

(10) Patent No.: US 9,180,616 B2
(45) Date of Patent: Nov. 10, 2015

(54) COMPONENT PART FOR AN INJECTION MOLDING TOOL

(71) Applicant: GUENTHER Heisskanaltechnik GmbH, Frankenberg (DE)

(72) Inventors: Herbert Guenther, Allendorf (DE); Siegrid Sommer, Burgwald (DE); Torsten Schnell, Lichtenfels (DE)

(73) Assignee: GÜNTHER Heisskanaltechnik GmbH, Frankenberg (DE)

( * ) Notice: Subject to any disclaimer, the term of this patent is extended or adjusted under 35 U.S.C. 154(b) by 0 days.

(21) Appl. No.: 14/221,347

(22) Filed: Mar. 21, 2014

(65) Prior Publication Data

US 2014/0287087 A1    Sep. 25, 2014

(30) Foreign Application Priority Data

Mar. 21, 2013   (DE) .......................... 10 2013 102 921

(51) Int. Cl.
| | |
|---|---|
| *B29C 45/22* | (2006.01) |
| *B29C 45/73* | (2006.01) |
| *B21D 37/20* | (2006.01) |
| *B29C 45/27* | (2006.01) |
| *B23P 15/00* | (2006.01) |

(52) U.S. Cl.
CPC ............ *B29C 45/7312* (2013.01); *B21D 37/20* (2013.01); *B29C 45/2725* (2013.01); *B23P 15/007* (2013.01); *B29C 45/2737* (2013.01); *B29C 2045/2717* (2013.01); *B29C 2045/2788* (2013.01); *Y10T 29/49826* (2015.01)

(58) Field of Classification Search
CPC ..................... B29C 45/2725; B29C 45/2717

USPC .................................................. 425/570, 572
See application file for complete search history.

(56) References Cited

U.S. PATENT DOCUMENTS

| | | | |
|---|---|---|---|
| 960,072 | A | 5/1910 | Burson |
| 3,806,295 | A | 4/1974 | Gellert |

(Continued)

FOREIGN PATENT DOCUMENTS

| | | |
|---|---|---|
| DE | 40 41 532 | 6/1992 |
| DE | 201 00 840 | 4/2001 |

(Continued)

OTHER PUBLICATIONS

U.S. Appl. No. 14/221,358, filed Mar. 21, 2014, Guenther et al.

(Continued)

*Primary Examiner* — Tim Heitbrink
(74) *Attorney, Agent, or Firm* — Clark & Brody

(57) ABSTRACT

A component part for an injection molding tool comprises a distributor that includes the first distributor plate, with a top side and underside. The component part has at least two material pipes that are aligned crosswise in relation to the underside of the first distributor plate and connected on the underside to the first distributor plate. Each material pipe has a flow channel configured therein, with feed channels configured in the first distributor plate being open on the underside into the flow channels of the material pipes. The feed channels on the top side of the first distributor plate are configured as open and the first distributor plate is monolithically formed together with the material pipes. An injection molding tool can be used with the component part and a method of making the component part is disclosed.

10 Claims, 12 Drawing Sheets

(56) References Cited

U.S. PATENT DOCUMENTS

| | | | |
|---|---|---|---|
| 4,689,473 | A | 8/1987 | Muller |
| 4,752,199 | A * | 6/1988 | Arai ............................ 425/130 |
| 4,946,092 | A | 8/1990 | Van Poorten |
| 5,286,184 | A * | 2/1994 | Nakayama .................... 425/573 |
| 5,536,164 | A * | 7/1996 | Brun et al. .................... 425/547 |
| 6,805,549 | B2 | 10/2004 | Gunther |
| 7,131,833 | B2 | 11/2006 | Babin |
| 7,320,588 | B2 * | 1/2008 | Feick ............................ 425/564 |
| 7,326,049 | B2 * | 2/2008 | Gellert et al. ................. 425/572 |
| 7,413,433 | B2 * | 8/2008 | Blundy ......................... 425/572 |
| 8,282,386 | B2 * | 10/2012 | Babin et al. .................. 425/543 |
| 2002/0181090 | A1 * | 12/2002 | Song et al. .................... 359/349 |
| 2004/0101589 | A1 | 5/2004 | Babin |
| 2005/0181090 | A1 * | 8/2005 | Olaru ............................ 425/549 |

FOREIGN PATENT DOCUMENTS

| | | |
|---|---|---|
| DE | 100 04 068 | 8/2001 |
| EP | 0 778 117 | 6/1997 |
| JP | 52-84978 | 6/1977 |

OTHER PUBLICATIONS

Menges, G, "Methods for Estimating the Tooling Costs", 1998, Seite S. 78-ISBN: 3-446 19437-1, and its English translation.

Prinz H. "Werkzeuge Fur Angussloses Spritzgiessen", Plastverarbeiter, Huethig GMBH, XP000002825. Apr. 1, 1988, Bd. 39, Nr. 4, 1. (mentioned in attached search report).

* cited by examiner

COMPONENT PART FOR AN INJECTION MOLDING TOOL

FIELD OF THE INVENTION

The invention relates to a component part for an injection molding tool, an injection molding tool with such a component part, and a method for producing such a component part.

BACKGROUND ART

Injection molding tools are used in plastics processing. They have, in most cases, a first tool half that supplies a flowable plastic material at a predeterminable temperature and under high pressure from a first tool half to a second tool half that can be separated from the first too half (molding cavity). The first tool half usually comprises a plurality of component parts, such as, for example, a bottom plate, distributor plate, a plurality of injection molding nozzles that are connected thereto, spacers, as well as a heating device with temperature monitoring. The distributor plate has, in most cases, a feed station as well as distribution channels that are configured within the distributor plate and that feed the plastic material mass as evenly as possible to the injection molding nozzles. Each injection molding nozzle has a flow channel that is incorporated in a material pipe and flow-connected to a distribution channel in the distributor plate, and which opens into a nozzle tip at the end thereof that is oriented towards the second tool half. The injection molding nozzles are fixedly connected to the distributor, for example by a screwed or flanged connection. Additional sealing is intended to ensure a leak-proof connection between the distributor plate and the injection molding nozzles.

The problem herein lies in the fact that the complexity in assembling the first tool half is relatively high, because the injection molding nozzles are often not connected to the distributor plate until the overall tool is fastened to the distributor plate. A correspondingly large available amount of space is necessary for this step in order to be able to insert as well as fasten the nozzles in place. Moreover, assembly errors can occur that will interfere with the later production process. For example, the injection molding nozzles and the distributor plate must be braced in relation to one another in such a manner that the interface ensures a leak-proof connection even in the cold operating state. On the other hand, the screwed connection between the nozzle and the distributor plate must allow for sufficient thermal expansion to ensure that no inadmissibly high tensile forces are created that can result in a tearing off of the nozzles. Correspondingly, due to the relatively frequent temperature changes, which occur, in most cases, at high temperatures, leaks can result at the interfaces between injection molding nozzles and distributor plate.

To solve this problem, DE 40 41 532 A1 proposes incorporating the distributor plate and the injection molding nozzles that are connected thereto into one composite body. The distribution channels therein are formed in the distributor plate, and the flow channels inside the injection molding nozzles are each formed by continuous pipes that are disposed inside a metal housing. The latter is then poured out with copper or a copper alloy; the result is a composite body comprising the distributor plate and the injection molding nozzles. Moreover, heating pipes are also poured in with the copper block, whose electric connection lines are guided to a joint supply hookup. The heating pipes are intended to maintain the plastic melt, which is routed through the continuous pipes, at a constant temperature, insofar as this is possible.

Producing such a component part for a tool half of an injection molding tool is quite a complex and expensive undertaking, because, first, it is necessary to produce a substantially rectangular block-like section for the distributor plate and a plurality of cylindrical sections for the injection molding nozzles that are welded thereto. Subsequently, the continuous pipes and the heating pipes must be positioned and fixed in place inside the housing to make sure that the individual elements do not shift, when the housing is poured out.

A further disadvantage of this apparatus is the fact that the separately configured housing sections that are intended for the injection molding nozzles take up a large amount of space, wherefore it is not possible to position the individual injection molding nozzles in sufficiently close proximity relative to each other. The spaces between the molding cavities are therefore quite large. However, many areas of application call for the spaces between cavities to be as small as possible so as to be able to feed separate cavities simultaneously or complicated component parts in minimally spaced gaps multiple times.

Also disadvantageous is the fact that the heating device is poured in with the copper block. If the heater becomes damaged, said heater cannot just be disassembled and replaced with a new heater. The total component part comprising the distributor plate, injection molding nozzles, heating pipes and temperature feeler must be replaced in this instance, thus resulting in unnecessary downtimes and unfavorable effects regarding the operating costs of the injection molding apparatus.

SUMMARY OF THE INVENTION

Therefore, it is the object of the present invention to avoid these and other disadvantages of the prior art and provide a component part for an injection molding tool that comprises a distributor plate and at least two material pipes that are produced by simple means, cost-effectively, and that are easy to handle. Also sought is a leak-proof arrangement of the injection molding nozzles on the distributor plate, which are disposed at very narrow cavity spacings.

The invention relates to a component part for an injection molding tool having a distributor with a first distributor plate, which has a top side and a underside, at least two material pipes that are aligned crosswise relative to the underside of the first distributor plate and connected on the underside to the first distributor plate, and wherein each material pipe contains a flow channel, and wherein feed channels are configured in the first distributor plate that open on the underside in the flow channels of the material pipes, and wherein the feed channels are configured as open on the top side of the first distributor plate, and wherein the first distributor plate is configured monolithically with the material pipes.

A component part for an injection molding tool according to the invention that has these properties has the advantage that a plurality of material pipes can be disposed as narrowly spaced next to each other. Any assembly of the material pipes on a conventional distributor plate has been omitted. According to the invention, sealing and fastening means between the distributor plate and the material pipes have been omitted. Rather, instead, together with the material pipes, the first distributor plate forms a monolithic unit. Without such sealing and fastening means, the free assembly space that is needed according to the prior art has thus been omitted. Moreover, due to the one-piece, monolithic configuration, sealing issues between the material pipe and the distributor plate do not arise even at great temperature fluctuations. The production of the monolithic unit is possible, in particular, by manufacture from a monolithic block of material, preferably from an iron block. Finally, the feed channels in the first distributor plate and the flow channels in the material pipes can be formed from the monolith. Overall, this means that the number of necessary individual parts is very small. Assembly errors are thus avoided and production costs reduced.

An improvement of the invention provide that the distributor includes a second distributor plate that rests against the top side of the first distributor plate, wherein distribution channels are configured between the first and the second distributor plates that establish a flow-type connection of inlet opening with the feed channels in the first distributor plate.

An extremely compact and simple design of the component part, comprising a distributor and material pipes, is achieved in this manner. The number of possible sealing points is also minimal. It makes sense to envision a single inlet opening that can be connected, in particular, to a machine nozzle. In terms of manufacturing engineering, the feed channels and/or the flow channels are configured as linear, for example by a bore. Moreover, it is also beneficial to coaxially align one flow channel and feed channel each. If necessary, one work step then suffices for producing a flow channel and a feed channel.

A special improvement of the invention provides for the distribution channels to be configured as grooves in the first distributor plate and/or in the second distributor plate. Grooves of this kind are easy to manufacture, for example by milling. Providing only one of the distributor plates with grooves is especially cost-effective. From a fluidics perspective, however, a configuration with grooves that are disposed opposite each other is preferable in order to avoid sharp radii in the cross-sections of the distribution channels. A further advantage of the grooves is the fact that they can be designed with more beneficial properties in support of the flow, such as, for example, greater radii in the event of directional changes. Due to the great flexibility with regard to groove depth and width, it is also possible to achieve very good balancing properties.

Moreover, a more detailed embodiment of the invention provides for the distributor to include a first heating device. This way, it is possible to adjust the temperature of a fluidized material that flows though the distribution channels and the feed channels. Blockages to the channels are thereby prevented. Moreover, the quality of component parts can be positively influenced by adjusting the temperature. A conceivable design is the insertion of heating coils inside the groove in the first and/or second distributor plate. By way of an alternate or supplemental solution, it is possible to insert cartridge heaters in the first and/or second distributor plate(s). A further alternate or supplemental solution provides for applying heating layers on the first and/or second distributor plate(s), for example by way of thick- or thin-film technology.

An optional configuration envisioning that one feed channel each opens in one flow channel each allows for a particularly simple and cost-effective insertion of the channels in the monolithic unit, which comprises the first distributor plate and the material pipes. Achieving a high level of compactness is possible as well.

A special improvement of the invention further provides that adjacent material pipes are spaced leaving a gap at least at the freed ends thereof. The gap thus separates the material pipes at the free ends thereof. This way, it is possible for the material pipes to undergo thermal expansion independently of each other in this area. Thermal deformations do not occur that are transferred from one material pipe to the next (at least in the context of the width of the gap). The seal at the free end of the material pipe relative to the sprue opening is subject to fewer irregular stresses, due to more even thermal tensions. A failure of this seal is therefore seldom. To achieve this level of freedom of movement, the gap should extend at least over two thirds of the length of the adjacently disposed material pipes. Preferably, the gap extends as far as possible; meaning, in as much as possible, all the way to the distributor plate.

One improvement is beneficial for achieving an especially high level of compactness, where the gap is less than 2 mm. Preferably, the gap is smaller than 1 mm, and particularly preferred smaller than 0.5 mm. Particularly suitable as a gap are laser cuts, wire cuts or erosions, particularly wire erosions. Very small measurements for the gap are achieved in this manner; with a wire cut, for example, the widths of the gap are between 0.3 mm and 0.4 mm, To provide a correctly fluidized material mass, one supplement of the invention proposes envisioning a second heating device in the material pipes.

In a special configuration, it makes sense to heat very narrowly spaced material pipes with a second heating device that includes a heating element, which is thermally coupled as touching at leach two material pipes. This way, the at least two material pipes share a common heating element, which saves space and is cost-effective. In a special embodiment, the second heating device comprises a heating plate that rests, by a contact area, against at least two material pipes, and which is preferably mounted thereto. This type of a design is simple and cost-effective. The contact area is, preferably, essentially flat. To this end, the material pipes should have a lateral truncation to allow for a contact surface that is as large as possible. Even with different thermal expansions of the material pipes and the heating plate, in the presence of a corresponding press-on force, the contact surface is preserved. Correspondingly, it is possible to use a preferred material, such as chemically nickel-coated brass, for the heating plates. To achieve the press-on force, employing the aid of a fastening means, the heating plate must be fixed in place to at least one material pipe. A detachable screwed connection makes sense in this context. To avoid that the individual material pipes transfer thermal stresses via the heating plate to adjacently disposed material pipes, a floating support of the heating plate to the material pipes is preferable, for example by combining screws and oblong through-holes. To further avoid uneven thermal heating, it makes further sense to dispose material pipes, which that are disposed in series, between two opposite heating plates. The second heating plate can be configured in correspondence to the first.

According to a further supplemental or alternate embodiment, it is provided that the heating element has at least one cartridge heater that is inserted in a recess in the material pipe, which is parallel relative to the flow channel of a material pipe. Cartridge heaters of this kind are particularly well suited for use in connection with material pipes that are disposed in series, adjacently relative to each other, because the dimension thereof only becomes enlarged in one direction due to the cartridge heater. This is preferably a direction that is transverse relative to the series. Further advantages of a cartridge heater are, in particular, the simple design, easy assembly and protected arrangement inside the recess. The recess is preferably a bore inside the material pipe. Alternately, instead of a bore, the recess can be configured as a groove.

In a special variant, the recess for the cartridge heater continues through the first distributor plate, wherein the connection cable of the cartridge heater is disposed outside of the first distributor plate and outside of the material pipe. This way, it is possible to route connection cables for the cartridge heater through the distributor and simply out of the crowded structural mounting area. Simultaneously, the connection cables of the cartridge heater can be positioned outside of the hot distributor plate. Damage to the heat-sensitive connection, particularly to a cable crimping disposed at this point, is thus avoided. Moreover, the cartridge heaters can be easily replaced in the event that a defect manifests itself. The recess is preferably configured as routed through the total distributor. If the recess is also configured as open at the free end of the material pipe, it is possible for the cartridge to be forced out of the recess, if it has gotten stuck. Ideally, the cartridge heater is held in position by a retaining means, such that a correct temperature control is ensured.

In an improvement of the present invention, the flow channels open, at the free ends of the material pipes, into a mouthpiece of a nozzle, respectively. Nozzle mouthpieces offer the advantage that any defective seal with regard to a sprue opening can be repaired by replacing said mouthpiece. Moreover, geometries that are complicated in terms of manufacturing and that are necessary in the area of the sprue opening can be particularly easily produced on a small individual part, such as the nozzle mouthpiece. The nozzle mouthpiece can also be produced of a material other than the material of the material pipe, particularly of a material with good heat-conducting properties and good resistance to wear and tear. The nozzle mouthpiece is typically inserted in the material pipe. Telescoping plug-in connections as well as screwed connections between the nozzle mouthpiece and the material pipe can be selected, depending on the requirements.

One supplement of the invention provides that at least one nozzle mouthpiece corresponds to a locking needle. Correspondingly, this way, it is possible to open and close at least one sprue opening by actuating the locking needle. This way, it is possible to positively influence the filling behavior of a mold cavity.

Furthermore, the invention relates to an injection molding tool with a component part as described above for an injection molding tool, wherein the flow channels of the material pipes are flow-connected at the free ends thereof to the sprue opening of a mold plate, and wherein the sprue openings open at least into one mold cavity in the mold plate. Correspondingly, the assembly provides an injection molding apparatus with the described advantages as embodied in the component part.

In a more detailed embodiment of the injection molding tool, a central machine nozzle is flow-connected to the distributor, particularly via the inlet opening. In special cases of use, the inlet opening can be disposed in the first distributor plate; preferably, however, it is disposed in the second distributor plate opposite the material pipes.

Furthermore, the invention also relates to a method for producing a component part for an injection molding tool as described above, where a first distributor plate of a distributor with a top side and an underside as well as at least two material pipes, which are aligned crosswise relative to the underside of the first distributor plate and connected on the underside with the first distributor plate, are manufactured from a monolithic material block, and wherein one flow channel each is incorporated in each material pipe, and feed channels are incorporated in the first distributor plate, and wherein the feed channels open on the underside of the first distributor plate into the flow channels of the material pipes, and wherein they are configured as open on the top side of the first distributor plate.

A monolithic unit comprising a first distributor plate and the material pipes is obtained with this advantageous method. The advantages of this monolithic unit correspond to those as specified above Further characteristics, details and advantages of the invention can be derived from the specified claims, as well as from the following description of embodiments based on the drawings. Shown are as follows:

DETAILED DESCRIPTION OF THE INVENTION

Figure 1:
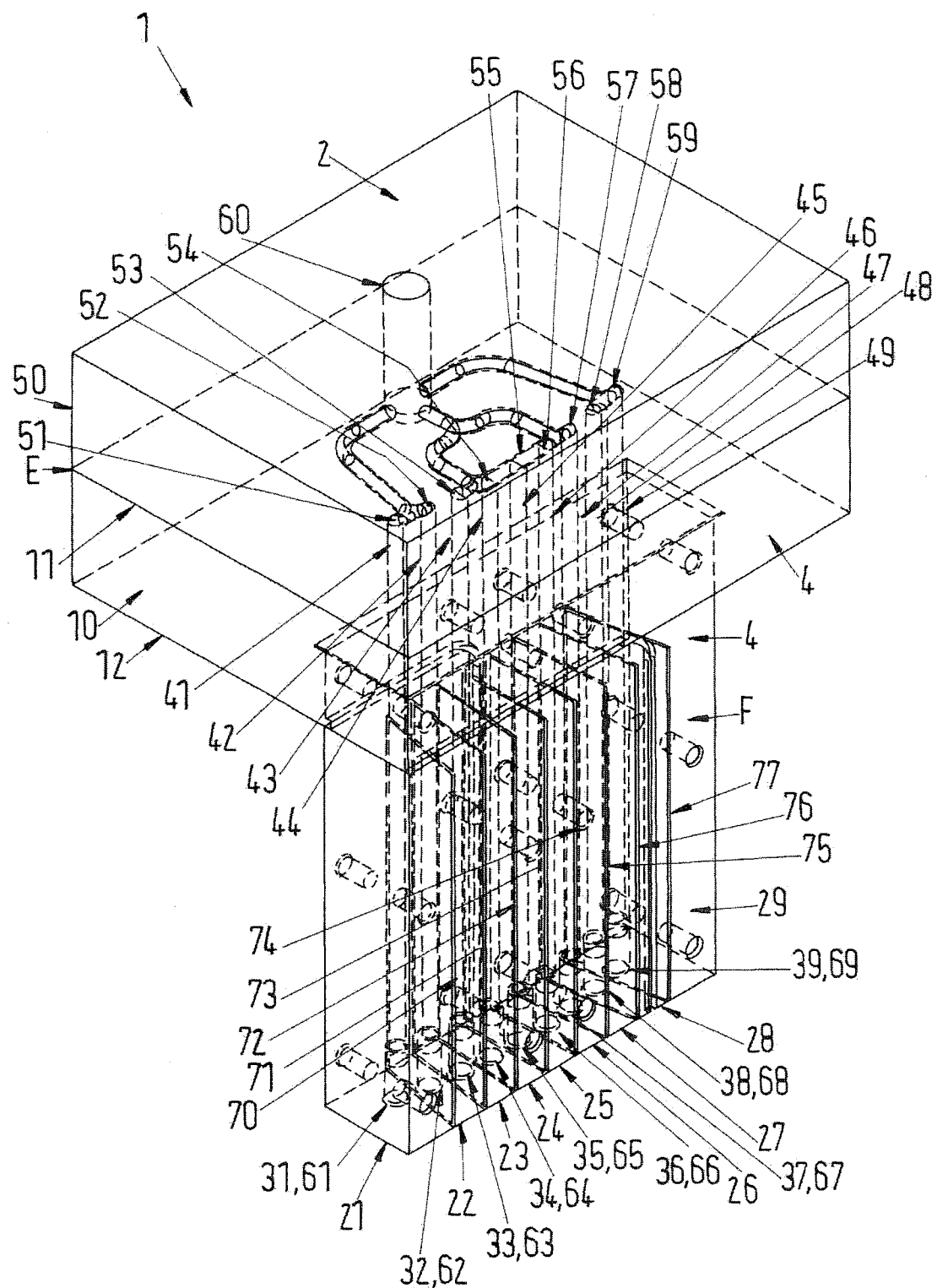
FIG. 1 is a perspective view of a component part for an injection molding tool, comprising a distributor plate and nine material pipes, wherein the first distributor plate is configured monolithically with the material pipes.

FIG. 1 is a representation of a perspective view of a component part 1 for an injection molding tool. The same comprises a distributor 2 with a first distributor plate 10, a second distributor plate 50 and nine material pipes 21, 22, 23, 24, 25, 26, 27, 28, 29. A monolith 4 is formed by the first distributor plate 10 and the material pipes 21, 22, 23, 24, 25, 26, 27, 28, 29, which is produced of monolithic block of material.

A can be seen, the first distributor plate 10 has a top side 11 and an underside 12. The material pipes 21, 22, 23, 24, 25, 26, 27, 28, 29 are aligned crosswise relative to the underside 12 of the first distributor plate 10, presently, in particular, they are oriented perpendicular or normal, respectively. On the underside 12, the material pipes 21, 22, 23, 24, 25, 26, 27, 28, 29 are connected to the first distributor plate 10, and/or there exists, at this point, a transition within the monolith 4 from the first distributor plate 10 to the material pipes 21, 22, 23, 24, 25, 26, 27, 28, 29. The material pipes 21, 22, 23, 24, 25, 26, 27, 28, 29 are disposed in series and adjacently next to each other. In particular, the series of pipes is disposed along a curved line.

Each material pipe 21, 22, 23, 24, 25, 26, 27, 28, 29 has a flow channel 31, 32, 33, 34, 35, 36, 37, 38, 39 configured therein. These are cylindrical holes whose longitudinal axes are also oriented crosswise relative to the underside 12 of the first distributor plate 10, particularly as a perpendicular/normal thereto. In relation to each other, the longitudinal axes of the cylindrical holes (bore holes) are parallel.

Feed channel 41, 42, 43, 44, 45, 46, 47, 48, 49 are configured in the area of the first distributor plate 10 inside the monolith 4. They open on the underside 12 of the first distributor plate 10 into the flow channels 31, 32, 33, 34, 35, 36, 37, 38, 39 of the material pipes 21, 22, 23, 24, 25, 26, 27, 28, 29. In particular, one feed channel 41, 42, 43, 44, 45, 46, 47, 48, 49 each opens at this point into one flow channel 31, 32, 33, 34, 35, 36, 37, 38, 39 each. On the top side 11 of the first distributor plate 10, the feed channels 41, 42, 43, 44, 45, 46, 47, 48, 49 are configured as open. It can be ascertained, furthermore, that the feed channels 41, 42, 43, 44, 45, 46, 47, 48, 49 of the first distributor plate 10 and the flow channels 31, 32, 33, 34, 35, 36, 37, 38, 39 of the material pipes 21, 22, 23, 24, 25, 26, 27, 28, 29 are disposed as linear and aligned in relation to each other. In fact, they coaxially transition into each other.

The distribution channels 51, 52, 53, 54, 55, 56, 57, 58, 59 can be seen on the top side 11 of the first distributor plate 10, which are formed by grooves inside the first distributor plate 10. They fluidically connect the feed channels 41, 42, 43, 44, 45, 46, 47, 48, 49 to the central inlet opening 60. The distribution channels 51, 52, 53, 54, 55, 56, 57, 58, 59 are closed off by a second distributor plate 50 that rests on the top side 11 of the first distributor plate 10. In conjunction, these first and second distributor plates 10, 50 form the distributor 2, wherein the distribution channels 51, 52, 53, 54, 55, 56, 57, 58, 59 are disposed in the separating plane thereof, which is plane E. The inlet opening 60 herein is configured as a bore through the second distributor plate 50.

At the bottom edge of the depiction, the material pipes 21, 22, 23, 24, 25, 26, 27, 28, 29 have the free ends 61, 62, 63, 64, 65, 66, 67, 68, 69. Material pipes 21, 22, 23, 24, 25, 26, 27, 28, 29, which are disposed, respectively, adjacently in relation to each other, are presently spaced leaving a gap 70, 71, 72, 73, 74, 75, 76, 77 there-between. In real dimensions, each gap 70, 71, 72, 73, 74, 75, 76, 77 is smaller (respectively, narrower) than 2 mm. The gaps 70, 71, 72, 73, 74, 75, 76, 77 are produced by a wire cut, laser cut or erosion, particularly wire erosion. It can be seen very nicely in this context that the material pipes 21, 22, 23, 24, 25, 26, 27, 28, 29 have uniform lengths. The free ends 61, 62, 63, 64, 65, 66, 67, 68, 69 therefore terminate in a common plane.

Furthermore, the gap 70, 71, 72, 73, 74, 75, 76, 77 extends over at least two thirds of the length of the respectively adjacent material pipes 21, 22, 23, 24, 25, 26, 27, 28, 29; presently, in fact, over the total length thereof; in particular, all the way to the underside 12 of the first distributor plate 10.

A monolith 4, as described previously, can be found seen from various perspectives, in different sections and details in the depictions as shown in the further FIGS. 2 to 12.

Specifically, FIG. 1 includes a lateral contact area F, which is a flat surface and extends over all nine of the material pipes 21, 22, 23, 24, 25, 26, 27, 28, 29 that are arranged in a series. Each material pipe therefor has a lateral truncation. In particular, these are two truncations that are disposed parallel and opposite in relation to each other. A configuration of this kind is due to the heating device 80, as selected below in FIGS. 2 to 8.

Figure 9:
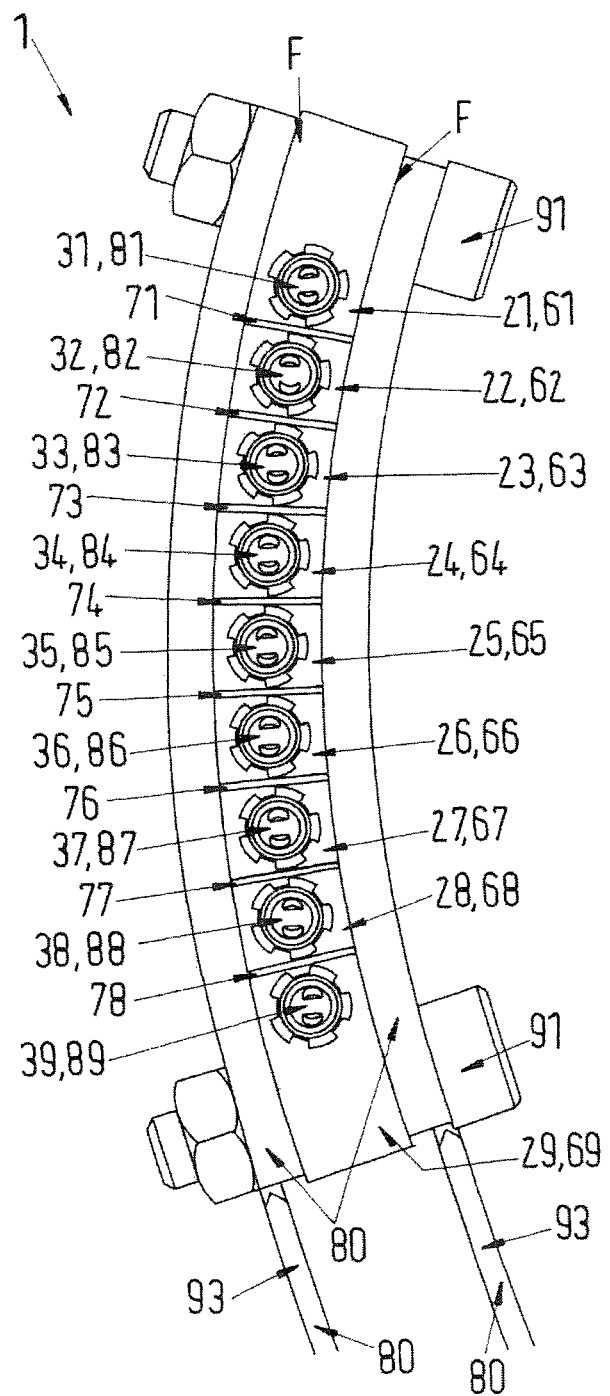
FIG. 9 is a variation of the component part as depicted in FIGS. 2 and 3, seen from the direction of the free ends of the material pipes, wherein a curved contact surface is configured between the second heating device and the material pipes, and wherein the distributor in the background has been omitted.

The material pipes 21, 22, 23, 24, 25, 26, 27, 28, 29, as depicted in FIG. 9, are also serially arranged, particularly on a radius of curvature. However, in this instance, the contact surface F is presently curved as well. In fact, the same follows the curvature of the row of material pipes 21, 22, 23, 24, 25, 26, 27, 28, 29. This way, the contact surface F is uniformly spaced in relation to the flow channels 31, 32, 33, 34, 35, 36, 37, 38, 39.

Figure 10:
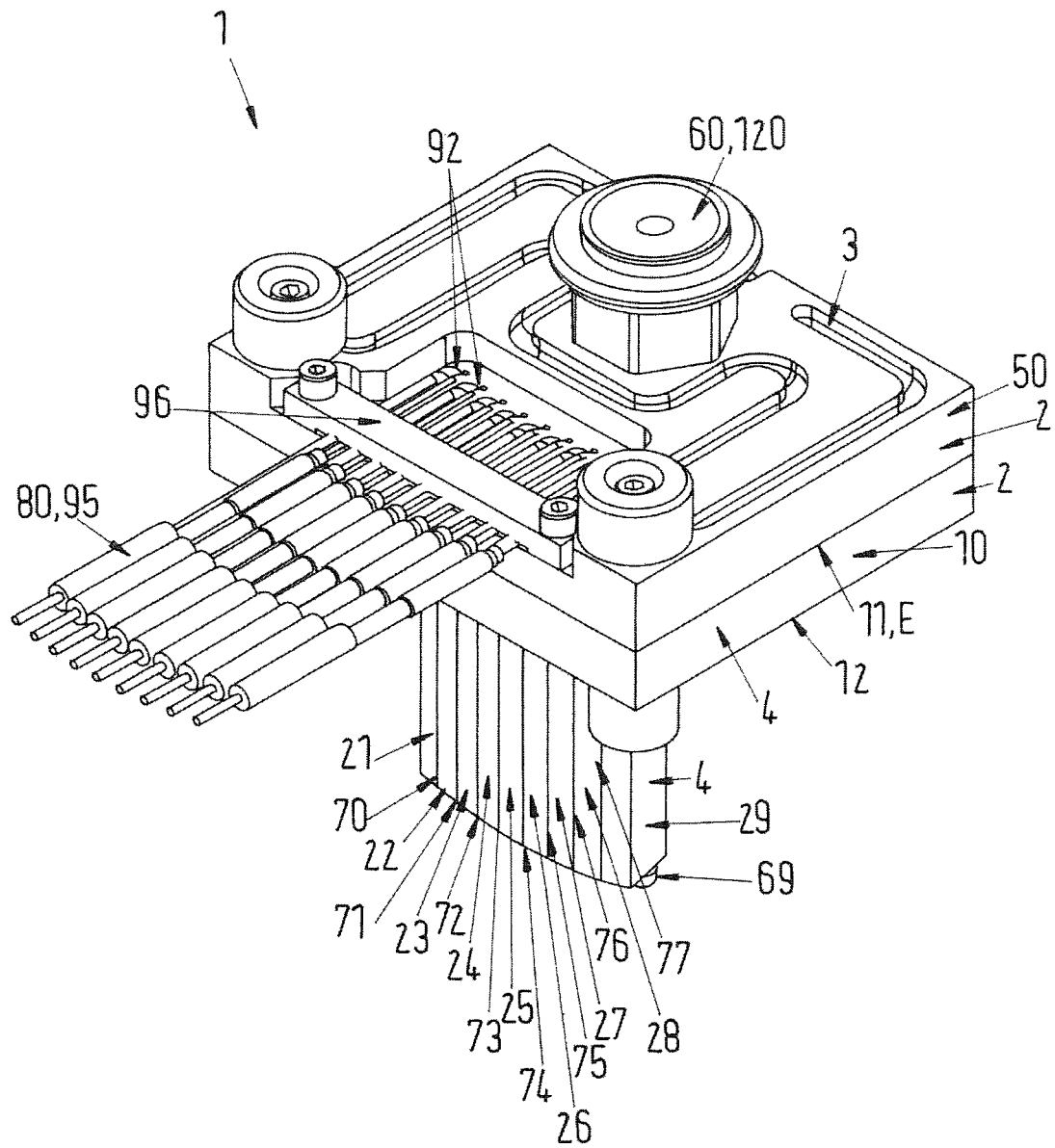
FIG. 10 is a perspective view of a component part for an injection molding tool, wherein a second heating device with cartridge heaters is provided.
Figure 11:
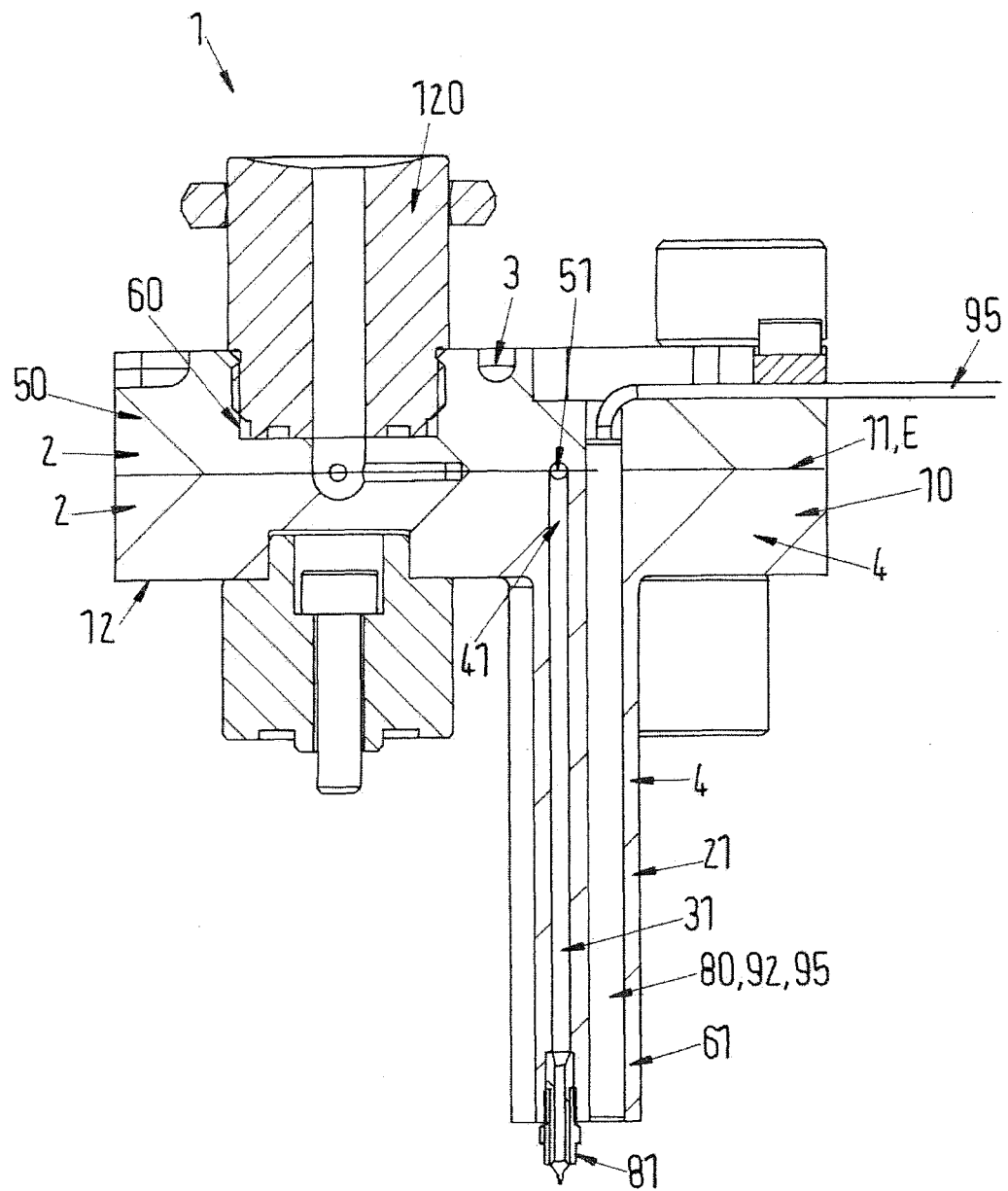
FIG. 11 is a longitudinal section of the component part as depicted in FIG. 10.
Figure 12:
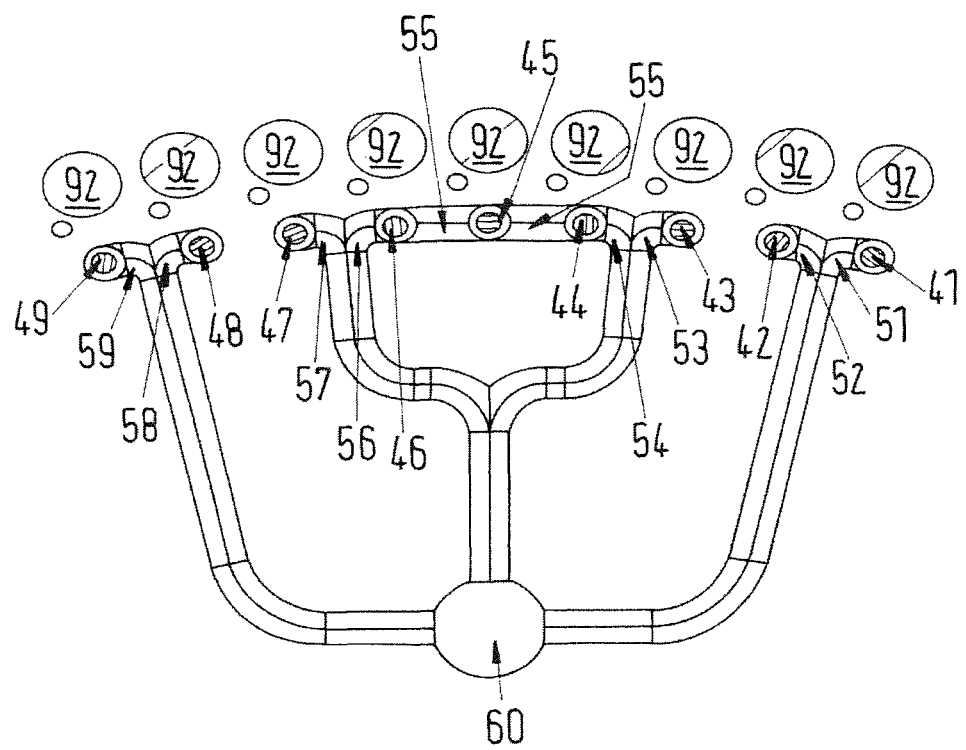
FIG. 12 is a view of the top side of the first distributor plate according to FIG. 10, particularly of the distribution and feed channels that are incorporated therein.

The configuration of the material pipes 21, 22, 23, 24, 25, 26, 27, 28, 29 according to the embodiment as shown according to FIGS. 10 to 12 differs from the embodiment as depicted in the FIG. 1 in that a recess 92, which extends parallel relative to the flow channel 31, 32, 33, 34, 35, 36, 37, 38, 39, is incorporated for accommodating one cartridge heater 95 each in the material pipe 21, 22, 23, 24, 25, 26, 27, 28, 29. These are, in particular, cylindrical bores. Each recess 92 is configured as open on the free end 61, 62, 63, 64, 65, 66, 67, 68, 69 of the respective material pipe 21, 22, 23, 24, 25, 26, 27, 28, 29. Opposite each other, the recesses 92 extend through the distributor plate 10.

Figure 2:
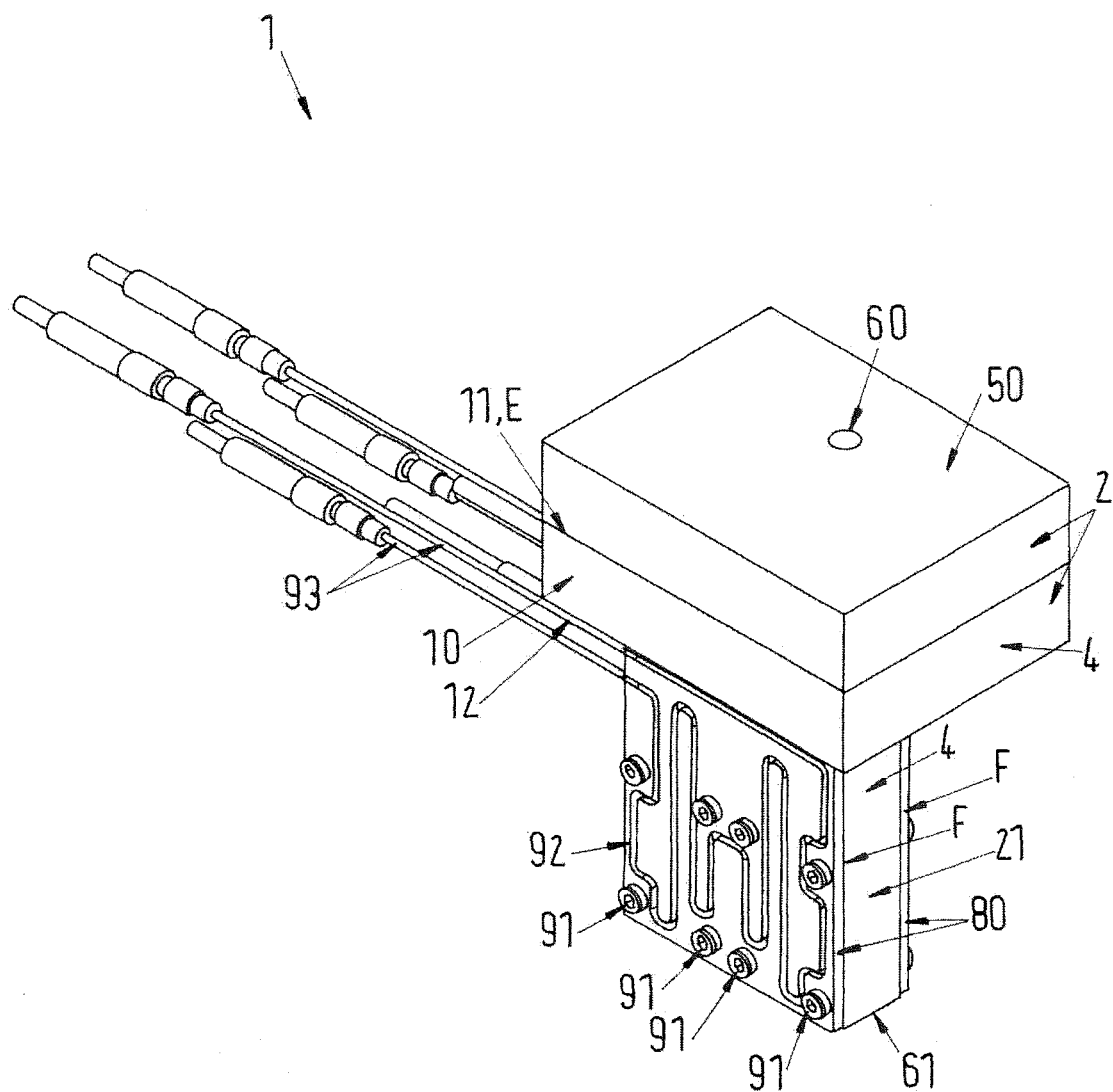
FIG. 2 is a perspective view of a component part for an injection molding tool as depicted in FIG. 1, supplemented by a second distributor plate and a second heating device.
Figure 3:
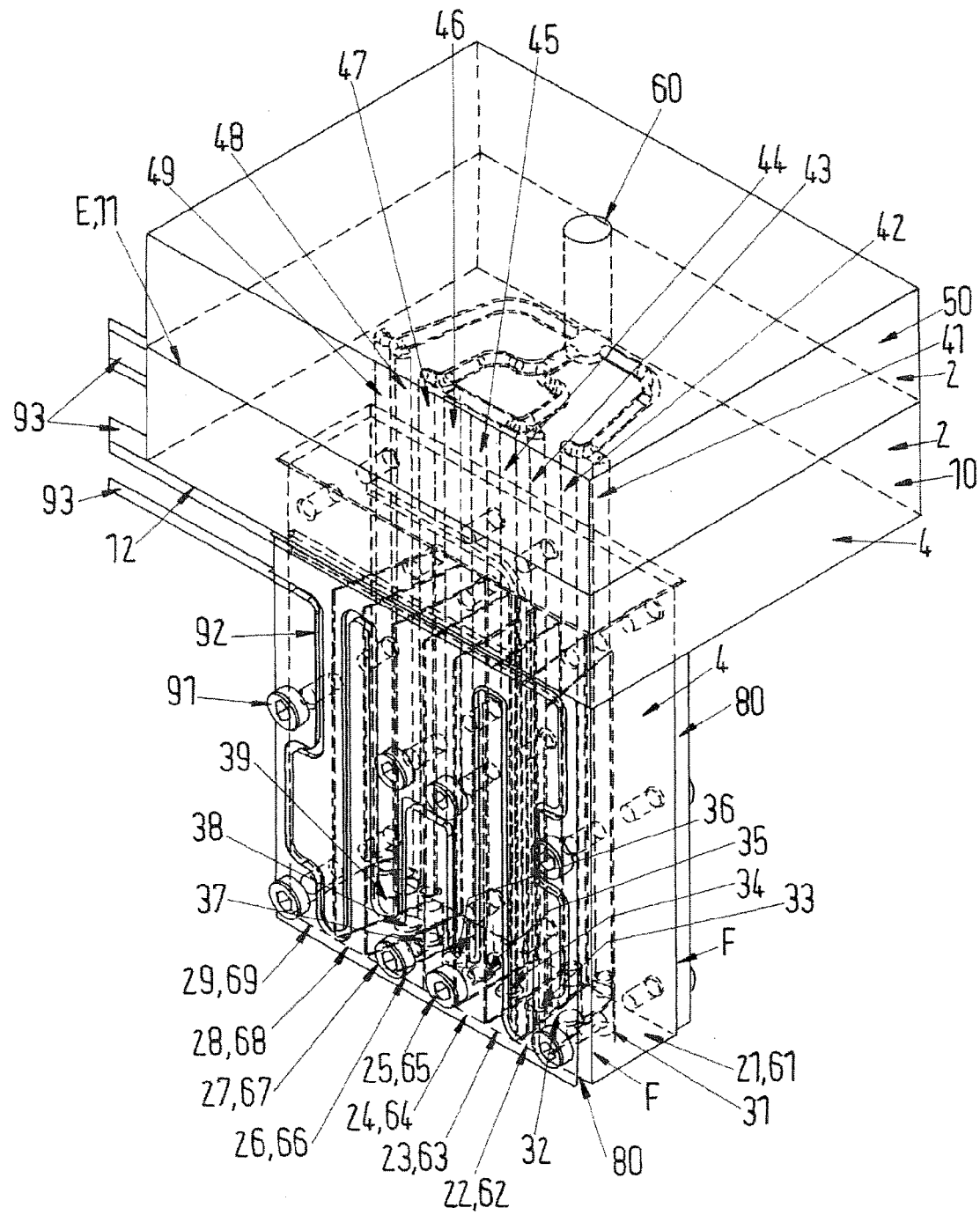
FIG. 3 is a transparent depiction of the component part that is shown in FIG. 2.

FIG. 2 depicts a perspective view of a component part 1 for an injection molding tool that comprises the component part according to FIG. 1 and is supplemented, in essence, by a second distributor plate 50 and a second heating device 80. FIG. 3 contains an enlarged detail of FIG. 2 that includes all the relevant characteristics of importance for the description. For purposes of improving the ease of viewing of the internally disposed features, the detail section is shown as transparent.

FIGS. 2 and 3 illustrate, first of all, that the distributor 2 is composed of a first distributor plate 10 and a second distributor plate 50. The second distributor plate 50 is disposed on the top side 11 of the first distributor plate 10. Only FIG. 3 shows, however, that the distribution channels (51, 52, 53, 54, 55, 56, 57, 58, 59) are disposed in the separating plane E between the first and the second distributor plate 10, 50 that constitute a fluid connection between a single, central inlet opening 60 and the feed channels 41, 42, 43, 44, 45, 46, 47, 48, 49 in the first distributor plate 10. The numbering of the distribution channels 51, 52, 53, 54, 55, 56, 57, 58, 59 can only be derived from FIG. 4, which shoes a view of the top side 11 of the first distributor plate 11 according to FIGS. 1 to 3. The distribution channels 51, 52, 53, 54, 55, 56, 57, 58, 59 in FIG. 3 are formed, in particular, by grooves in the first distributor plate 10 and grooves in the second distributor plate 50, which are disposed opposite of each other. The grooves have at least in sections a semi-circular cross-section.

A second heating device 80 is allocated to the material pipes 21, 22, 23, 24, 25, 26, 27, 28, 29 in FIGS. 2 and 3. The same includes two heating elements 80 that are each thermally coupled, in a touching manner, to the nine material pipes 21, 22, 23, 24, 25, 26, 27, 28, 29.

In the shown embodiment, the heating elements 80 are configured as heating panels that rest against the material pipes 21, 22, 23, 24, 25, 26, 27, 28, 29 via, respectively, one of two contact surfaces F, which are disposed opposite each other. The material pipes 21, 22, 23, 24, 25, 26, 27, 28, 29 are thus sandwiched between the two heating panels. Corresponding to the geometry of FIG. 1, the contact surfaces F according to FIGS. 2 and 3 are flat.

To fix the heating panels in place and to achieve a press-on force between the heating plate and the material pipes, said panels are mounted by fastening means 91 to four of the nine material pipes 21, 22, 23, 24, 25, 26, 27, 28, 29. Eight screws are provided for this purpose. They extend each through the first heating panel, a hole in the material pipe and through the second heating panel, and they are mounted by a nut at the terminal end. The holes in the material pipes 21, 22, 23, 24, 25, 26, 27, 28, 29 have at least in one direction a larger width than the thickness of the screw in this area. This way, a floating support is achieved between the heating panel and the material pipes 21, 22, 23, 24, 25, 26, 27, 28, 29.

A recess 92 is configured on the exterior side of the heating panels, particularly a groove, where a heating coil 93 with connection cables is inserted. The main component part of the heating panel is chemically nickel-coated brass.

Figure 5:
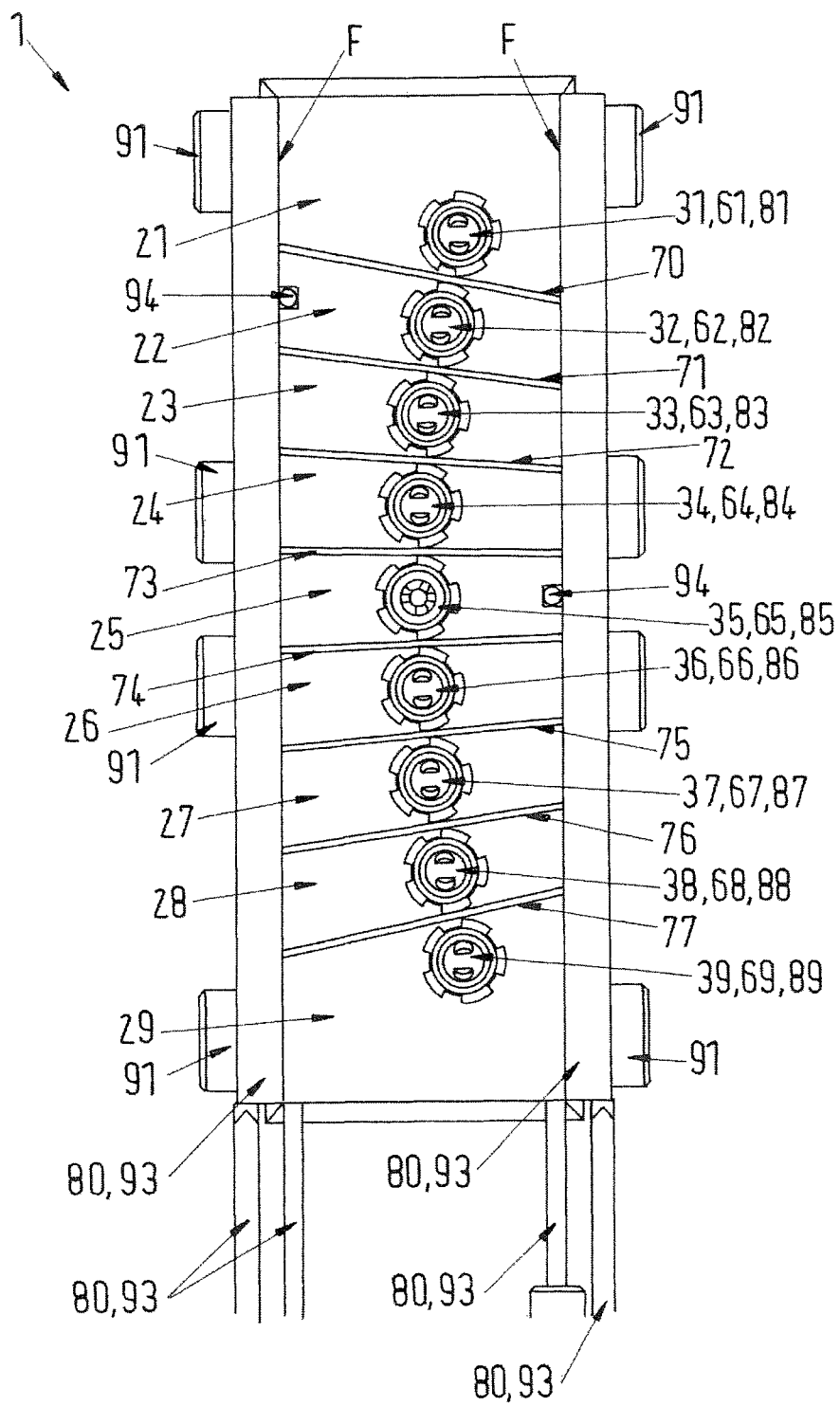
FIG. 5 is a perspective view of the component part as depicted in FIGS. 2 and 3, seen from the direction of the free ends of the material pipes, wherein the distributor in the background has been omitted.

FIG. 5 is a perspective view of the component part 1 as depicted in FIGS. 2 and 3, seen from the direction of the free ends 61, 62, 63, 64, 65, 66, 67, 68, 69 of the material pipes 21, 22, 23, 24, 25, 26, 27, 28, 29. To improve the ease of viewing, the distributor, including the first distributor plate 10 in the background, have been omitted.

It can be seen very nicely in FIG. 5 that the flow channels 31, 32, 33, 34, 35, 36, 37, 38, 39 open by the free ends 61, 62, 63, 64, 65, 66, 67, 68, 69 of the material pipes 21, 22, 23, 24, 25, 26, 27, 28, 29 into a nozzle mouthpiece 81, 82, 83, 84, 85, 86, 87, 88, 89. The latter are inserted into the flow channels 31, 32, 33, 34, 35, 36, 37, 38, 39.

It can also be seen very nicely that the contact surfaces F between the heating panels 80 and the material pipes 21, 22, 23, 24, 25, 26, 27, 28, 29 extend parallel in relation to each other. Simultaneously, the flow channels 31, 32, 33, 34, 35, 36, 37, 38, 39 of the material pipes 21, 22, 23, 24, 25, 26, 27, 28, 29, however, are disposed in series and adjacently relative to each other on a curved line.

Moreover, the gap 70, 71, 72, 73, 74, 75, 76, 77 between the individual material pipes 21, 22, 23, 24, 25, 26, 27, 28, 29, particularly between the free ends 61, 62, 63, 64, 65, 66, 67, 68, 69 thereof, can also be discerned.

The arrangement of the fastening means 91 is the same as set forth in the description of FIGS. 2 and 3.

Figure 6:
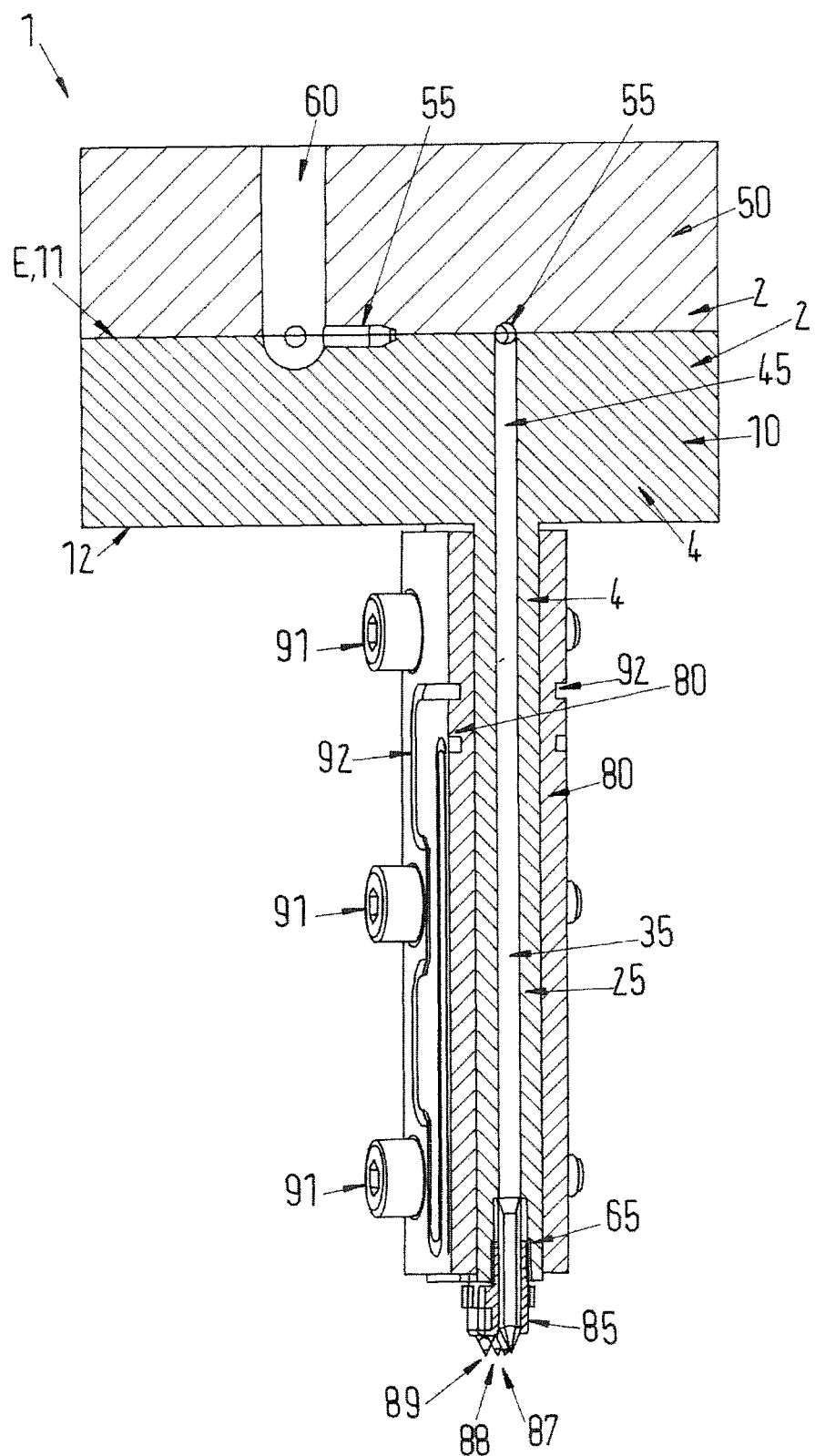
FIG. 6 is a longitudinal section of the component part as depicted in FIGS. 2 and 3.

FIG. 6 is a longitudinal section of a component part as shown in FIGS. 2 and 3. In particular, the section extends through the fifth flow channel 35 of the fifth material pipe 25. The design of the heating device 80 with heating elements that are configured as heating panels, which are mounted to the material pipes by screws, corresponds to the description regarding FIGS. 2, 3 and 5. The recesses 92 on the exterior side of the heating panels, which are in the manner of grooves, can be seen very clearly in this context.

The longitudinal section very nicely illustrates the configuration of the material pipes 21, 22, 23, 24, 25, 26, 27, 28, 29 together with the first distributor plate 10 in form of a monolith 4. Correspondingly, there is no change in materials and also no point where the underside 12 of the first distributor plate 10 and the fifth material point 25 are joined together. In addition, the linear as well as coaxial configuration of the fifth flow channel 35 and the fifth feed channel 45 are illustrated very clearly.

A fifth nozzle mouthpiece 85 is inserted in the free end 65 of the fifth material pipe 25. In the alignment thereof, it reveals the tips of the seventh, eighth and ninth nozzle mouthpieces 87, 88, 89. The sixth nozzle mouthpiece is hidden by the fifth nozzle mouthpiece.

The distributor 2 can be found in the upper half of the drawing. Particularly visible is the configuration of the distribution channels, specifically of the fifth distribution channel 55, inside the separation plane E between the first and the second distributor plates 10, 50. This fifth distribution channel 55 is formed by the grooves in the top side 11 of the distributor plate 10 and the second distributor plate 50 that are disposed opposite each other. It connects the fifth feed channel 45 to an inlet feed opening 60 that traverses the second distributor plate 60.

Figure 7:
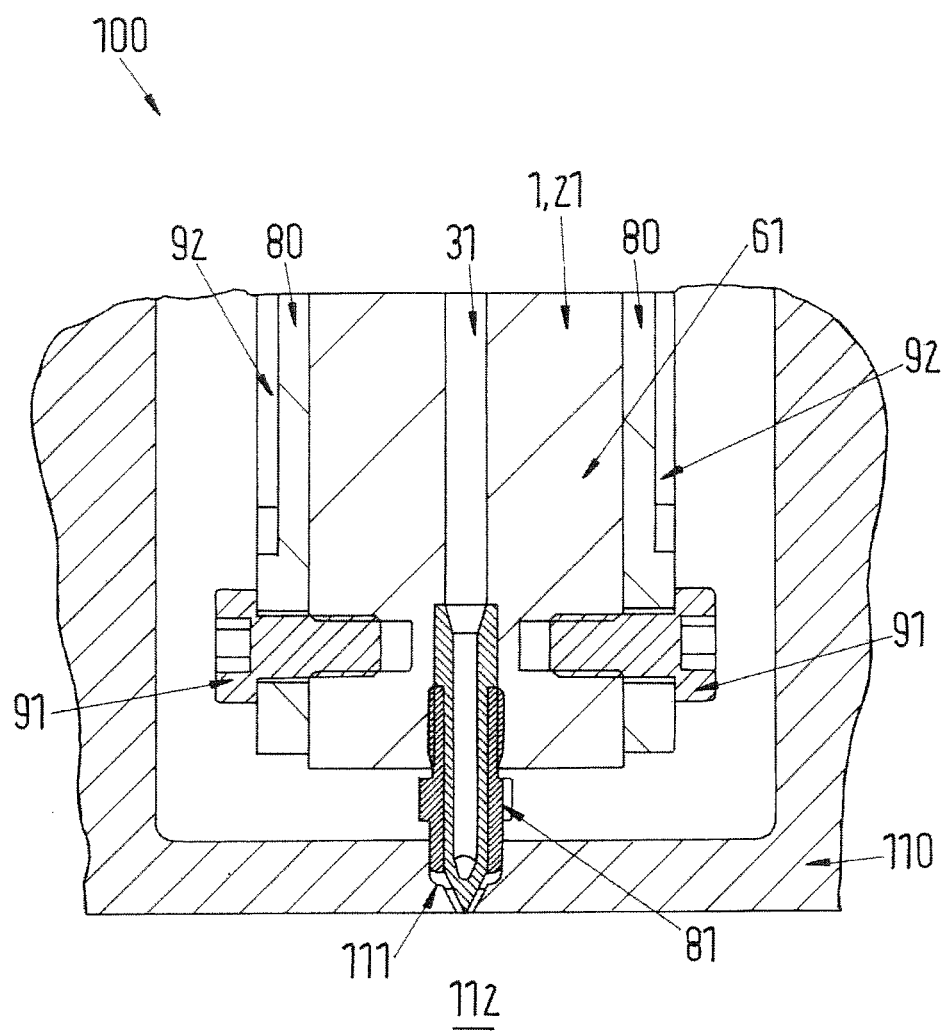
FIG. 7 is a detail of a longitudinal section of the injection molding tool, comprising a component part as depicted in FIGS. 2 and 3.

FIG. 7 is a detail of a longitudinal section through an injection molding tool 100, comprising a component part from FIGS. 2 and 3, as described above. In particular, a free end 61 of a first material pipe 21 is discernable. Mounted thereto is, first of all, a heating device 80 by a fastening means 91, particularly screws. The heating device 80 comprises two heating panels that are disposed opposite each other, and the first material pipe 21 is disposed there-between. Recesses 92 are disposed on the exterior side of the heating panels and configured for accommodating a heating coil.

By the free end 61 thereof, the first material pipe 21 plunges into a mold plate 110. A first nozzle mouthpiece 81 that is inserted in the flow channel 31 rests by the protruding end thereof inside the sprue opening 110, which is disposed in the mold plate 110. The sprue opening 111 opens into a mold cavity 112, which is presently only hinted at.

Figure 8:
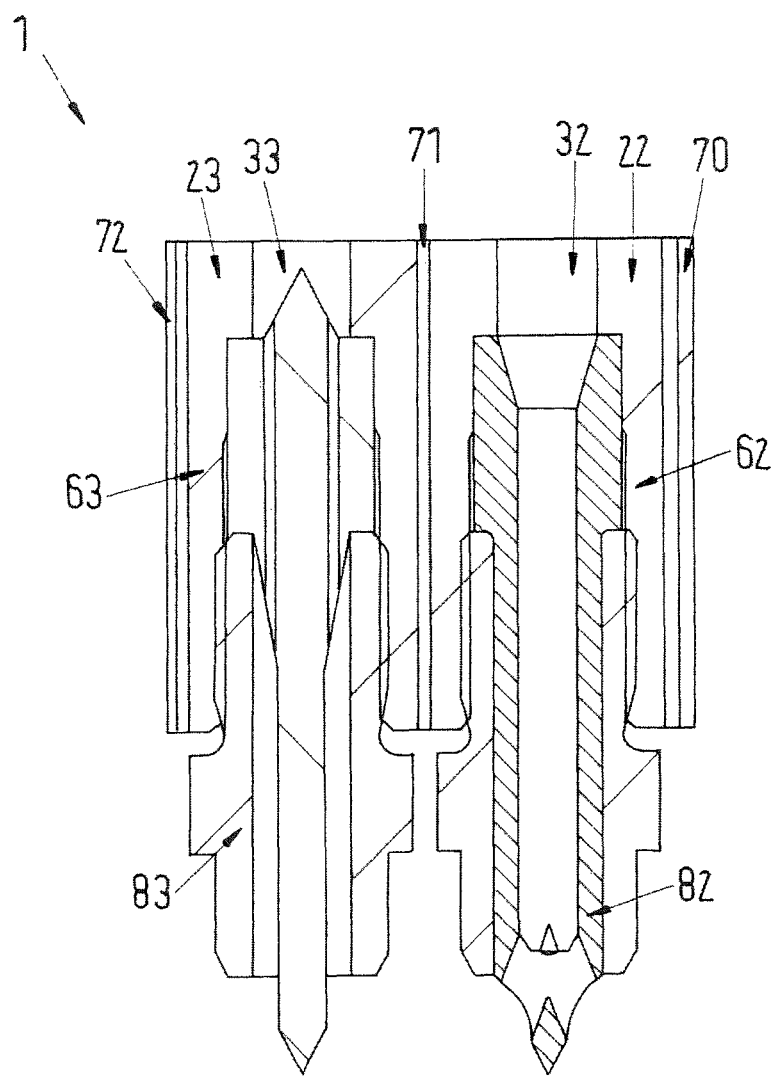
FIG. 8 is a detail of a longitudinal section of the component part as depicted in FIGS. 2 and 3, wherein two different nozzle mouthpieces are inserted in two material pipes that are disposed next to each other.

FIG. 8 depicts a detail of a longitudinal section of the component part 1 as shown in FIGS. 2 and 3, wherein two different nozzle mouthpieces 82, 83 are inserted in the flow channels 32, 33 of two adjacent material pipes 22, 23. The left nozzle mouthpiece 83 has a so-called torpedo that functions as a centrally as well as coaxially disposed flow body in the nozzle mouthpiece. The right nozzle mouthpiece 82, on the other hand, has radially distributed outlet openings and a nozzle tip at the end thereof.

The nozzle mouthpieces 82, 83 are configured each in two parts. An outer sealing ring is thrown over an internal flow element and screwed into the respective flow channel 32, 33.

The embodiment according to FIG. 9 corresponds to the exceptions of the embodiment according to FIG. 5, as described below. As a deviation, the contact surfaces F between the second heating device 80 and the material pipes 21, 22, 23, 24, 25, 26, 27, 28, 29 are curved. The distance between the flow channels 31, 32, 33, 34, 35, 36, 37, 38, 39 of the material pipes 21, 22, 23, 24, 25, 26, 27, 28, 29 and the contact surface F is thus, for the most part, constant.

FIG. 10 depicts a perspective view of a component part 1 for an injection molding tool that comprises a slightly modified component part 1 according to FIG. 1. FIG. 11 contains a longitudinal section of the component parts as represented in FIG. 10.

Regarding the configuration of the second heating device 80, the embodiment according to FIGS. 10 and 11 differs from the embodiment as depicted in FIGS. 2 to 7 and 9. In particular, cartridge heaters 95 are presently inserted. To accommodate the cartridge heater 95, each material pipe 21, 22, 23, 24, 25, 26, 27, 28, 29 must be provided with a recess 92 that extends parallel relative to the flow channel 31, 32, 33, 34, 35, 36, 37, 38, 39. Specifically, these are bores. Each recess 92 is configured as open on the free end 61, 62, 63, 64, 65, 66, 67, 68, 69 of the respective material pipe 21, 22, 23, 24, 25, 26, 27, 28, 29. On the opposite side, the recesses 92 extend through the first and the second distributor plates 10, 50, whereby it is possible to comfortably insert the cartridge heaters 95 from above into the recesses 92. The second distributor plate 50 has a depressed step in this area. The connection lines of the cartridge heaters 95 are bent substantially at a right angle above the first distributor plate 10 and guided away from the distributor plates 10, 50 to the outside. This prevents the cartridge heaters 95 from slipping any deeper into the recesses 92. To prevent the tangling of cable and the cartridges 95 from slipping out of the recesses 92, a hold-down retainer 96 is placed on the angled connection cables. The hold-down retainer 96 is fixed in place on the second distributor plate 50.

Moreover, the embodiment according to FIGS. 10 and 11 is characterized by a first heating device 3 for heating the distributor 2. It has an exterior recess in the second distributor plate, particularly a groove where a heating coil can be inserted.

Also depicted on the top side of the second distributor plate 50 is, furthermore, a machine nozzle 120 that opens into the inlet opening 60 in the second distributor plate 50. In particular, the machine nozzle 120 plunges into the inlet opening.

Especially FIG. 11 shows explicitly how the recess 92 for accommodating a cartridge heater 95 is incorporated, parallel in relation to a first flow channel 31, inside a first material pipe 21, the first distributor plate 10 and the second distributor plate 50. Moreover, as can be seen in FIG. 6, the distribution channels, particularly the first distribution channel 51, which are located in the separation plane E, are configured by way of grooves in the top side 11 of the first distributor plate 10 and the second distributor plate 50.

Regarding the machine nozzle 120, FIG. 11 indicates that the same is screwed into the inlet opening 60.

Figure 4:
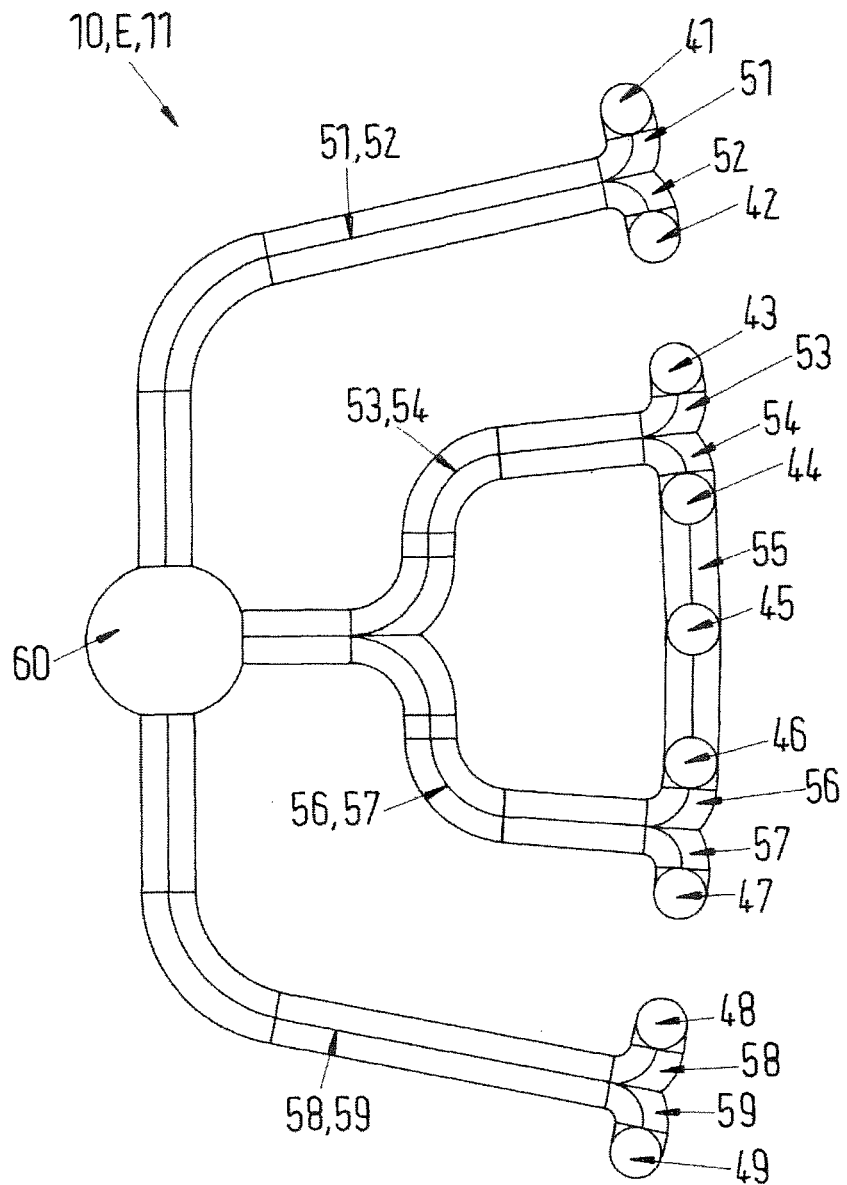
FIG. 4 is a view of the top side of the first distributor plate according to FIGS. 1 to 3, particularly of the distribution and feed channels that are incorporated therein.

FIG. 12 is a view of the top side 11 of the first distributor plate 10 according to FIG. 10; in certain aspects, it is equivalent to FIG. 4. Shown are the distribution channels 51, 52, 53, 54, 55, 56, 57, 58, 59 and feed channels 41, 42, 43, 44, 45, 46, 47, 48, 49 that are incorporated in the top side 11 of the first distributor plate 10. The distribution channels 51, 52, 53, 54, 55, 56, 57, 58, 59 connect a central inlet opening 60 to the feed channels 41, 42, 43, 44, 45, 46, 47, 48, 49.

Moreover, the feed channels 41, 42, 43, 44, 45, 46, 47, 48, 49 are disposed adjacently next to each other on a curved line, particularly with a constant radius. Recesses 92 for accommodating the cartridge heaters are disposed on a parallel extending, additional line, particularly one having a greater radius.

The invention is not limited to any one of the previously described embodiments; rather, the invention can be varied in a plurality of different ways.

In particular, the second heating device can be composed of a plurality of the shown heating elements; these are, namely, heating elements and/or heating panels and/or cartridge heater.

Moreover, a first heating device can be added to all embodiments. The same can be in contact with the first and/or the second distributor plate, respectively.

A further alternate variation can be derived by incorporating the distribution channels and/or the related grooves that are provided for this purpose only in one of the two distributor plate; namely, either in the first or in the second distributor plate only.

Furthermore, it is not necessarily required for the material pipes to have the identical lengths. The length can vary according to the position of the sprue points.

The totality of the characterizing features and benefits that are derived from the claims, the description and the drawing, including any structural details, spatial arrangements and method steps, can be essential in terms of the spirit of the invention independently as standalone solutions or in combination with other features.

LIST OF REFERENCE SIGNS

| | |
|---|---|
| 1 | Component part |
| 2 | Distributor |
| 3 | First heating device |
| 4 | Monolith |
| 10 | First distributor plate |
| 11 | Top side |
| 12 | Underside |
| 21 | First material pipe |
| 22 | Second material pipe |
| 23 | Third material pipe |
| 24 | Fourth material pipe |
| 25 | Fifth material pipe |
| 26 | Sixth material pipe |
| 27 | Seventh material pipe |
| 28 | Eighth material pipe |
| 29 | Ninth material pipe |
| 31 | First flow channel |
| 32 | Second flow channel |
| 33 | Third flow channel |
| 34 | Fourth flow channel |
| 35 | Fifth flow channel |
| 36 | Sixth flow channel |
| 37 | Seventh flow channel |
| 38 | Eighth flow channel |
| 39 | Ninth flow channel |
| 41 | First feed channel |
| 42 | Second feed channel |
| 43 | Third feed channel |
| 44 | Fourth feed channel |
| 45 | Fifth feed channel |
| 46 | Sixth feed channel |
| 47 | Seventh feed channel |
| 48 | Eighth feed channel |
| 49 | Ninth feed channel |
| 50 | Second distributor plate |
| 51 | First distribution channel |
| 52 | Second distribution channel |
| 53 | Third distribution channel |
| 54 | Fourth distribution channel |
| 55 | Fifth distribution channel |
| 56 | Sixth distribution channel |
| 57 | Seventh distribution channel |
| 58 | Eighth distribution channel |
| 59 | Ninth distribution channel |
| 60 | Inlet opening |
| 61 | First free end |
| 62 | Second free end |
| 63 | Third free end |
| 64 | Fourth free end |
| 65 | Fifth free end |
| 66 | Sixth free end |
| 67 | Seventh free end |
| 68 | Eighth free end |
| 69 | Ninth free end |
| 70 | First gap |
| 71 | Second gap |
| 72 | Third gap |
| 73 | Fourth gap |
| 74 | Fifth gap |
| 75 | Sixth gap |
| 76 | Seventh gap |
| 77 | Eighth gap |
| 80 | Second heating device |
| 81 | First nozzle mouthpiece |
| 82 | Second nozzle mouthpiece |
| 83 | Third nozzle mouthpiece |
| 84 | Fourth nozzle mouthpiece |
| 85 | Fifth nozzle mouthpiece |
| 86 | Sixth nozzle mouthpiece |
| 87 | Seventh nozzle mouthpiece |
| 88 | Eighth nozzle mouthpiece |
| 89 | Ninth nozzle mouthpiece |
| 91 | Fastening means |
| 92 | Recess (for second heating device) |
| 93 | Heating coils with connections |
| 94 | Themperature sensor |
| 95 | Cartridge heater with connection cable |
| 96 | Hold-down retainer |
| 100 | Injection molding tool |
| 110 | Mold plate |
| 111 | Sprue opening |
| 112 | Mold cavity |
| 120 | Central machine nozzle |
| E | Separation plane |
| F | Contact surface |

The invention claimed is:

1. A component part (1) for an injection molding tool (100),
a) with a distributor (2) that includes a first distributor plate (10) having a top side (11) and an underside (12),
b) with at least two material pipes (21, 22, 23, 24, 25, 26, 27, 28, 29) that are aligned crosswise relative to the underside (12) of the first distributor plate (10) and connected on the underside (12) to the first distributor plate (10),
c) wherein each material pipe (21, 22, 23, 24, 25, 26, 27, 28, 29) has a flow channel (31, 32, 33, 34, 35, 36, 37, 38, 39) configured therein, and
d) wherein feed channels (41, 42, 43, 44, 45, 46, 47, 48, 49) are configured in the first distributor plate (10) opening on the underside (12) into the flow channels (31, 32, 33, 34, 35, 36, 37, 38, 39) of the material pipes (21, 22, 23, 24, 25, 26, 27, 28, 29),
e) wherein the feed channels (41, 42, 43, 44, 45, 46, 47, 48, 49) are configured as open on a top side (11) of the first distributor plate (10),
f) wherein the first distributor plate (10) is configured monolithically with the material pipes (21, 22, 23, 24, 25, 26, 27, 28, 29);
g) wherein a first heating device (80) is allocated to the material pipes (21, 22, 23, 24, 25, 26, 27, 28, 29);
f) the first heating device (80) includes at least one cartridge heater (95) that is inserted into a recess (92) in a material pipe (21, 22, 23, 24, 25, 26, 27, 28, 29) that is parallel relative to the flow channel (31, 32, 33, 34, 35, 36, 37, 38, 39) of the material pipe (21, 22, 23, 24, 25, 26, 27, 28, 29); and
h) wherein the recess (92) for the cartridge heater (95) continues through the first distributor plate (10), wherein a connection cable of the cartridge heater (95) is disposed outside of the first distributor plate (10) and outside of the material pipe (21, 22, 23, 24, 25, 26, 27, 28, 29).

2. The component part (1) for an injection molding tool (100) according to claim 1, characterized in that the distributor (2) includes a second distributor plate (50) that rests against the top side (11) of the first distributor plate (10), wherein distribution channels (51, 52, 53, 54, 55, 56, 57, 58, 59) are configured in the separation plane (E) between the first and the second distributor plates (10, 50) that provide a fluid connection between the inlet opening (60) and the feed channels (41, 42, 43, 44, 45, 46, 47, 48, 49) in the first distributor plate (10).

3. The component part (1) for an injection molding tool (100) according to claim 2, characterized in that the distribution channels (51, 52, 53, 54, 55, 56, 57, 58, 59) are formed by grooves in the first distributor plate (10) and/or in the second distributor plate (50).

4. The component part (1) for an injection molding tool (100) according to claim 1, characterized in that the distributor (2) includes a second heating device (3).

5. The component part (1) for an injection molding tool (100) according to claim 1, characterized in that one feed channel (41, 42, 43, 44, 45, 46, 47, 48, 49) each opens into each of a flow channels (31, 32, 33, 34, 35, 36, 37, 38, 39).

6. The component part (1) for an injection molding tool (100) according to claim 1, characterized in that adjacent material pipes (21, 22, 23, 24, 25, 26, 27, 28, 29) are spaced with a gap (70, 71, 72, 73, 74, 75, 76, 77) there-between at least on free ends (61, 62, 63, 64, 65, 66, 67, 68, 69) thereof.

7. The component part (1) for an injection molding tool (100) according to claim 6, characterized in that the gap (70, 71, 72, 73, 74, 75, 76, 77) is smaller than 2 mm.

8. The component part (1) for an injection molding tool (100) according to claim 1, characterized in that the first heating device (80) includes a heating element (80) that is thermally coupled, in a touching manner, to at least two material pipes (21, 22, 23, 24, 25, 26, 27, 28, 29).

9. The component part (1) for an injection molding tool (100) according to claim 1, characterized in that each of the flow channels (31, 32, 33, 34, 35, 36, 37, 38, 39) opens at the free ends (61, 62, 63, 64, 65, 66, 67, 68, 69) of the material pipe (21, 22, 23, 24, 25, 26, 27, 28, 29) into a nozzle mouthpiece (81, 82, 83, 84, 85, 86, 87, 88, 89).

10. An injection molding tool (100) with a component part (1) according to claim 1, wherein the flow channels (31, 32, 33, 34, 35, 36, 37, 38, 39) of the material pipes (21, 22, 23, 24, 25, 26, 27, 28, 29) are fluidically connected at the free ends (61, 62, 63, 64, 65, 66, 67, 68, 69) thereof with a sprue opening (111) of a mold plate (110), wherein the sprue openings (111) open at least in one mold cavity (112) in the mold plate (110).

* * * * *